Aug. 23, 1932.    J. DE MOOY    1,873,304

HOSE COUPLING

Filed June 19, 1929

Inventor:
John De Mooy
Kwis Hudson & Kent
Attys.

Patented Aug. 23, 1932

1,873,304

UNITED STATES PATENT OFFICE

JOHN DE MOOY, OF SHAKER HEIGHTS, OHIO, ASSIGNOR TO THE CLEVELAND PNEUMATIC TOOL COMPANY, OF CLEVELAND, OHIO, A CORPORATION OF OHIO

HOSE COUPLING

Application filed June 19, 1929. Serial No. 372,028.

This invention relates to improvements in hose couplings, particularly hose couplings employed in connection with vacuum lines and compressed air lines.

One of the objects of the invention is the provision of means for preventing the scoring or grooving of the male member of the coupling during the separation of its members, owing to spring pressure exerted upon the detents.

Other objects and features of novelty will appear as I proceed with the description of that embodiment of the invention which, for the purposes of the present application, I have illustrated in the accompanying drawing, in which.

Figure 1:
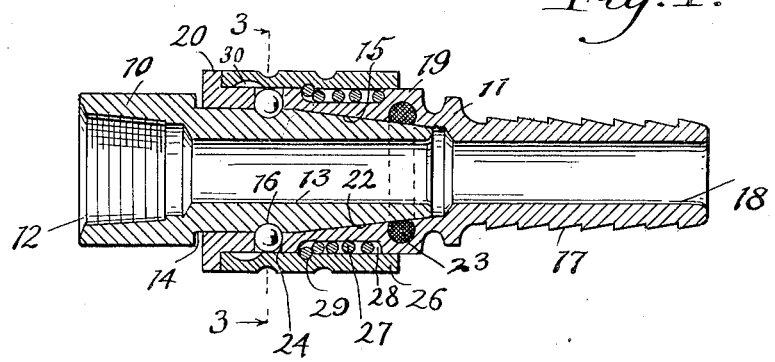
Fig. 1 is a longitudinal sectional view of a coupling, showing the members in operative position.

In the drawing, the male member of the coupling is shown at 10, and the female member at 11. The member 10 may be internally threaded at its outer end, as indicated at 12, for the reception of a threaded connector (not shown). It has an internal bore 13 through which fluid may flow. This member 10, beyond that portion containing the threads 12, has a cylindrical surface 14 of a somewhat smaller diameter which merges into a tapered surface 15, that extends to the inner end of the member. Near the juncture between the surfaces 14 and 15, bnt preferably in the surface 14, there is an annular groove 16.

Figure 4:
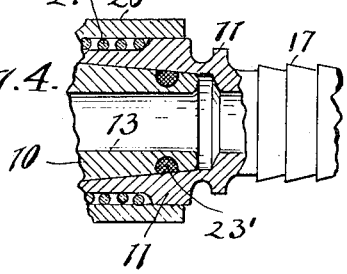
Fig. 4 is a fragmentary longitudinal section, showing a modification.

The female member 11 has a hose-receiving shank 17 provided with annular serrations to assist in retaining the hose, and having an internal bore 18. The remaining portion of this member has a generally cylindrical outer surface 19 terminating in an annular shoulder 20. Internally this portion of the member 11 has a cylindrical surface 21 of a size to receive the surface 14 of the male member and a tapered surface 22 of a size to fit the surface 15 of the male member when the latter is pushed inwardly as far as it will go. In the tapered surface 22 there is formed a groove in which I mount packing 23 for sealing the joint. If preferred, however, packing 23' may be mounted in the male member, as illustrated in Fig. 4.

Near the inner end of the member 11 there are one or more circular openings 24 which are constricted slightly at their inner ends forming stops to prevent the detent balls 25, which are mounted in the openings, from moving inwardly beyond a certain position. These balls are adapted to enter the groove 16 and thus secure the two members 10 and 11 against relative movement longitudinally. They are held in that position normally by a sleeve 26 which is slidably mounted upon the surface 19 of the member 11. The sleeve is held normally against the shoulder 20 by the coil spring 27 located in an annular groove 28 in the member 11, one end of this spring having an abutment 29 in the inner surface of the sleeve and the other end pressing against one end wall of the groove 28. The sleeve 26 is provided with an internal annular groove 30 which may be caused to overlie the opening 24 when the sleeve is sufficiently retracted against the pressure of spring 27. The circle defined by the innermost position of the balls 25 and drawn concentric with the axis of the coupling members 10 and 11 is termed hereinafter the circle of action of the balls or detents.

Figure 2:
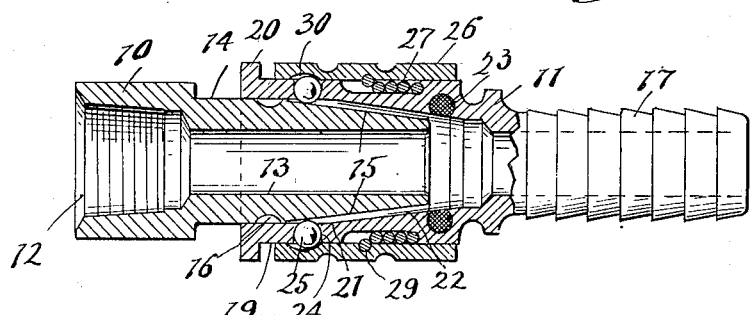
Fig. 2 is a similar view illustrating the members in a partially separated condition.
Figure 3:
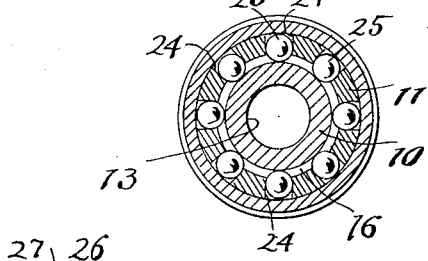
Fig. 3 is a cross sectional view taken substantially on the line 3—3 of Fig. 1.

Assuming that the coupling is in its normal operative position, illustrated in Fig. 1, and that the operator desires to separate the parts of the coupling, he then grasps the sleeve 26 and slides it against the action of spring 27 from the position shown in Fig. 1 to a position where the groove 30 is in alignment with the openings 24. A pull is then exerted upon the member 11 as a whole, which causes the balls 25 to ride outwardly away from the groove 16 and over the edge of the latter onto the exterior surface of the male member. Now, during the further separation of the parts, if the operator continues to hold the sleeve 26 against the force of spring 27, to maintain the groove 30 in a position overlying the openings 24, the balls 25 will be under no pressure tending to produce wear on the outer surface of the male member of the coupling. The operator or workman, however, will quite likely release his hold upon the sleeve 26 as soon as the balls 25 have left the groove 16, whereby the spring 27 immediately causes the groove 30, in the sleeve, to exert an inward camming action on the balls 25. Were I to employ a cylindrical surface on the exterior of the male member, this camming of the balls 25 inwardly would cause them to bear heavily upon such cylindrical surface and injure the same during the separation of the coupling members. By making the surface 15 tapered, however, the camming of the balls 25 inwardly, as indicated in Fig. 2, is prevented from doing harm, as the restricted inner ends of the openings 24 prevent the balls from moving inwardly beyond a certain position, heretofore termed the circle of action, and in that position they cannot contact with the tapered surface 15 except at the larger end of that surface. Hence, as the two members of the joint are pulled apart or pushed together, a considerable portion of the tapered surface of the male member, particularly the portion which underlies the packing 23 or which includes the packing 23', is out of range of the dents. Consequently, no wear, tending to reduce scoring or grooves transversely of the packing, occurs.

While in the foregoing description and accompanying drawing I have illustrated more or less in detail a preferred embodiment of the invention, I desire it to be understood that such detailed disclosure is primarily for the purpose of fully illustrating the invention, and is not to be construed as amounting to a limitation upon the scope thereof.

Having thus described my invention, I claim:

1. In a hose coupling, male and female members having tapered mating surfaces, an annular packing carried by the tapered portion of one of said members for engagement with the tapered surface of the other member, said male member having an annular groove therein spaced from the entering end of the member and said female member carrying a detent adapted to project into said groove, means tending to hold said detent in its inward position and capable of release to enable said detent to move out of said groove when the said members are being disconnected, the sealing surface of said annular packing being located along the mating tapered surfaces at a position which is inside of the circle of action of said detent.

2. In a hose coupling, male and female members having tapered mating surfaces, an annular packing carried by the tapered portion of the female member for engagement with the tapered surface of the male member, said male member having an annular groove therein spaced from the entering end of the member and said female member carrying a detent adapted to project into said groove, means tending to hold said detent in its inward position and capable of release to enable said detent to move out of said groove when the said members are being disconnected, said annular packing being located at a position along the tapered surface of said female member such that the area of the male tapered surface adapted to engage therewith when the coupling members are connected lies inside of the circle of action of said detent.

3. In a hose coupling, male and female members having tapered mating surfaces, an annular packing mounted in one of said members for engagement with the tapered surface of the other member, said male member having an annular groove therein spaced from the entering end of the member and said female member carrying a detent adapted to project into said groove, means tending to hold said detent in its inward position and capable of release to enable said detent to move out of said groove when the said members are being disconnected, the exposed face of said annular packing and the portion of the tapered surface of the other member which the packing engages being located near the small end of said tapered surfaces entirely inside the circle of action of said detent.

In testimony whereof, I hereunto affix my signature.

JOHN DE MOOY.